(12) United States Patent
Asseman et al.

(10) Patent No.: US 11,646,944 B2
(45) Date of Patent: May 9, 2023

(54) CONFIGURING COMPUTING NODES IN A THREE-DIMENSIONAL MESH TOPOLOGY

(71) Applicant: International Business Machines Corporation, Armonk, NY (US)

(72) Inventors: Alexis Asseman, San Jose, CA (US); Ahmet Serkan Ozcan, Los Altos, CA (US); Charles Edwin Cox, San Jose, CA (US); Pritish Narayanan, San Jose, CA (US); Nicolas Antoine, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/480,956

(22) Filed: Sep. 21, 2021

(65) Prior Publication Data

US 2022/0006702 A1 Jan. 6, 2022

Related U.S. Application Data

(62) Division of application No. 16/812,053, filed on Mar. 6, 2020, now Pat. No. 11,184,245.

(51) Int. Cl.
*H04L 41/12* (2022.01)
*H04L 45/02* (2022.01)
(Continued)

(52) U.S. Cl.
CPC ............. *H04L 41/12* (2013.01); *H04L 45/02* (2013.01); *H04L 45/12* (2013.01); *H04L 45/22* (2013.01); *H04L 67/10* (2013.01)

(58) Field of Classification Search
CPC ......... H04L 41/12; H04L 45/02; H04L 45/12; H04L 45/22; H04L 67/10
(Continued)

(56) References Cited

U.S. PATENT DOCUMENTS 6,647,428 B1 11/2003 Bannai et al.
7,075,892 B2 7/2006 Grover et al.
(Continued)

FOREIGN PATENT DOCUMENTS

| EP | 2568673 A1 | 3/2013 |
| GB | 2227341 A | 7/1990 |
| WO | 2018151640 A1 | 8/2018 |

OTHER PUBLICATIONS

B. S. Feero and P. P. Pande, "Networks-on-Chip in a Three-Dimensional Environment: A Performance Evaluation," in IEEE Transactions on Computers, vol. 58, No. 1, pp. 32-45, Jan. 2009 (Year: 2009).*
(Continued)

*Primary Examiner* — Nicholas R Taylor
*Assistant Examiner* — Chong G Kim
(74) *Attorney, Agent, or Firm* — Zilka-Kotab, P.C.

(57) ABSTRACT

A system according to one embodiment includes a collection of computing nodes arranged in a mesh of N×M×Z topology, the nodes including computational hardware, wherein Z<N and Z<M, and wherein N and M are at least equal to 4; a collection of I/O connections interfaced with one of the sides of the mesh, said side having N×M nodes, each of the I/O connections being tied to a unique one of the nodes in said side; and I/O cards that are tied to the I/O connections.

20 Claims, 9 Drawing Sheets

(51) Int. Cl.
  *H04L 45/00* (2022.01)
  *H04L 45/12* (2022.01)
  *H04L 67/10* (2022.01)
(58) Field of Classification Search
  USPC .......................................................... 370/254
  See application file for complete search history.

(56) References Cited

U.S. PATENT DOCUMENTS

| | | | |
|---|---|---|---|
| 8,160,061 | B2 | 4/2012 | Ballew |
| 8,406,154 | B2 | 3/2013 | Wan et al. |
| 8,774,632 | B2 | 7/2014 | Archambault |
| 8,830,873 | B2 | 9/2014 | Tomic et al. |
| 8,891,360 | B2 | 11/2014 | Ahuja et al. |
| 9,025,595 | B2 | 5/2015 | Rossi et al. |
| 9,652,425 | B2 | 5/2017 | Chen et al. |
| 10,135,731 | B2 | 11/2018 | Davis et al. |
| 10,289,586 | B2 | 5/2019 | Ballew et al. |
| 10,374,885 | B2 | 8/2019 | Liguori et al. |
| 10,394,747 | B1 | 8/2019 | Paneah et al. |
| 11,184,245 | B2 | 11/2021 | Asseman et al. |
| 2007/0242685 | A1 | 10/2007 | Archer et al. |
| 2008/0101395 | A1 | 5/2008 | Ballew |
| 2015/0172991 | A1 | 6/2015 | Petersen et al. |
| 2015/0261724 | A1 | 9/2015 | Billi |
| 2015/0301964 | A1 | 10/2015 | Brinicombe et al. |
| 2016/0112506 | A1* | 4/2016 | Kanbayashi ........ H04L 67/1031 709/203 |
| 2017/0131915 | A1 | 5/2017 | Leidel |
| 2017/0220499 | A1 | 8/2017 | Gray |
| 2017/0249412 | A1 | 8/2017 | Subramanian et al. |
| 2018/0213669 | A1 | 7/2018 | Kochukunju |
| 2018/0300265 | A1 | 10/2018 | Roberts et al. |
| 2018/0343685 | A1 | 11/2018 | Hart et al. |
| 2019/0013965 | A1 | 1/2019 | Sindhu et al. |
| 2019/0155666 | A1 | 5/2019 | Dobbs et al. |
| 2019/0236038 | A1 | 8/2019 | Choudhary et al. |
| 2019/0246187 | A1 | 8/2019 | Wong |
| 2021/0281488 | A1 | 9/2021 | Asseman et al. |

OTHER PUBLICATIONS

Notice of Allowance from U.S. Appl. No. 16/812,053, dated Aug. 25, 2021.
IBM, List of IBM Patents Or Patent Applications Treated As Related, dated Oct. 4, 2021, 2 pages.
Sankaralingam et al., "Universal Mechanisms for Data-Parallel Architectures," Proceedings of the 36th International Symposium on Microarchitecture, 2003, pp. 1-12.
Asaad et al., "A Cycle-accurate, Cycle-reproducible multi-FPGA System for Accelerating Multi-core Processor Simulation," Proceedings of the ACM/SIGDA International Symposium on Field Programmable Gate Arrays, Feb. 2012, pp. 153-161.
Babaeizadeh, M., "GA3C: GPU-based A3C for Deep Reinforcement Learning," 30th Conference on Neural Information Processing Systems, 2016, pp. 1-6, retrieved from https://arxiv.org/pdf/1611.06256v1.pdf.
Bellemare et al., "The Arcade Learning Environment: An Evaluation Platform for General Agents," Journal of Artificial Intelligence Research, vol. 47, 2013, pp. 253-279, retrieved from https://arxiv.org/pdf/1207.4708.pdf.
Brockman et al., "OpenAI Gym," Cornell University, 2016, pp. 1-4, retrieved from https://arxiv.org/pdf/1606.01540.pdf.
Dally et al., "Hardware-Enabled Artificial Intelligence," Symposium on VLSI Circuits Digest of Technical Papers, 2018, pp. 3-6.
Deng et al.,"ImageNet: A Large-Scale Hierarchical Image Database," CVPR, 2009, 8 pages, retrieved from http://www.image-net.org/papers/imagenet_cvpr09.pdf.
Dhariwal et al., "OpenAI baselines," GitHub, 2017, 5 pages, retrieved from https://github.com/openai/baselines.
Furber et al., "The SpiNNaker Project," Proceedings of the IEEE, vol. 102, No. 5, May 2014, pp. 652-665.
Geist et al., "MPI-2: Extending the Message-Passing Interface," Spinger, 1996, pp. 1-14, retrieved from https://www.researchgate.net/publication/220769186_MPI-2_Extending_the_Message-Passing_Interface.
Gupta et al., "Deep Learning with Limited Numerical Precision," Proceedings of the 32nd International Conference on Machine Learning, JMLR: W&CP, vol. 37, 2015, pp. 1-10.
Han et al., "Deep Compression: Compressing Deep Neural Networks with Pruning, Trained Quantization and Huffman Coding," ICLR, 2016, pp. 1-14, retrieved from https://arxiv.org/pdf/1510.00149.pdf.
Haring et al., "The IBM Blue Gene/Q Compute Chip," Hot Chips, IEEE Micro, Mar./Apr. 2012, pp. 48-60.
Jouppi et al., "In-Datacenter Performance Analysis of a Tensor Processing Unit," ISCA, Jun. 2017, pp. 1-12.
Mnih et al., "Asynchronous Methods for Deep Reinforcement Learning," Proceedings of the 33 rd International Conference on Machine Learning, JMLR: W&CP, vol. 48, 2016, 10 pages.
Muuss, M., "The Story of the PING Program," 2010, 4 pages, retrieved from https://www.webcitation.org/5saCKBpgH on Mar. 3, 2020.
Painkras et al., "SpiNNaker: A 1-W 18-Core System-on-Chip for Massively-Parallel Neural Network Simulation," IEEE Journal of Solid-State Circuits, vol. 48, No. 8, Aug. 2013, pp. 1943-1953.
Silver et al., "Mastering the game of Go with deep neural networks and tree search," Nature, vol. 529, Jan. 28, 2016, 20 pages.
IPerf, "iPerf—The ultimate speed test tool for TCP, UDP and SCTP," iPerf.fr, 2020, 3 pages, retrieved from https://iperf.fr/ on Mar. 4, 2020.
Wayne et al., "Unsupervised Predictive Memory in a Goal-Directed Agent," arXiv, 2018, 57 pages, retrieved from https://arxiv.org/pdf/1803.10760.pdf.
Weaver, V., "Linux perf event Features and Overhead," FastPath Workshop, 2013, pp. 1-7.
Courbariaux et al., "Low precision arithmetic for deep learning," arXiv, 2014, 9 pages, retrieved from https://arxiv.org/pdf/1412.7024v2.pdf.
NVIDIA, "The NVIDIA Deep Learning Accelerator," NVIDIA Corporation, presentation in Proceedings of Hot Chips 30, 2018, 18 pages.
Krupnova, H., "Mapping Multi-Million Gate SoCs on FPGAs: Industrial Methodology and Experience," Proceedings of the Design, Automation and Test in Europe Conference and Exhibition, 2004, 6 pages.
Asseman et al., U.S. Appl. No. 16/812,053, filed Mar. 6, 2020.
International Search Report and Written Opinion from PCT Application No. PCT/IB2021/050535, dated Apr. 26, 2021.
Restriction Requirement from U.S. Appl. No. 16/812,053, dated Jun. 16, 2021.
Corrected Notice of Allowance from U.S. Appl. No. 16/812,053, dated Oct. 27, 2021.

* cited by examiner

900

| 902 | Use a Computational Device having a Collection of Computing Nodes Arranged in a Mesh N x M x Z Topology to Perform Computations Characterized by (i) an Initial System I/O Bandwidth and (ii) an Initial System Node-to-Node Latency, where the Nodes Include Computational Hardware, Z < N and Z < M, and N and M are at Least Equal to 4 |

| 904 | Reconfigure the Device Into a Mesh N' x M' x Z' Topology, Wherein at Least Two of N, M, and Z Values are Different from their Corresponding N', M', and Z' Values, and Wherein N x M x Z is Equal to N' x M' x Z' |

| 906 | Use the Device to Perform Computations Characterized by (i) a Modified System I/O Bandwidth and (ii) a Modified System Node-to-Node Latency |

FIG. 9

CONFIGURING COMPUTING NODES IN A THREE-DIMENSIONAL MESH TOPOLOGY

BACKGROUND

The present invention relates to parallel processing systems, and more specifically, this invention relates to optimizing an input/output (I/O) bandwidth and a node-to-node latency within parallel processing systems.

Parallel processing systems are useful for performing computations on many different types and quantities of data. For example, parallel processing systems may be used to implement one or more neural networks. However, parallel processing systems are currently unable to adjust their performance characteristics in response to changing workload demands.

SUMMARY

A system according to one embodiment includes a collection of computing nodes arranged in a mesh of N×M×Z topology, the nodes including computational hardware, wherein Z<N and Z<M, and wherein N and M are at least equal to 4; a collection of I/O connections interfaced with one of the sides of the mesh, said side having N×M nodes, each of the I/O connections being tied to a unique one of the nodes in said side; and I/O cards that are tied to the I/O connections.

According to another embodiment, a method includes arranging a collection of computing nodes in a mesh of N×M×Z topology, the nodes including computational hardware, wherein Z<N and Z<M, and wherein N and M are at least equal to 4; interfacing a collection of I/O connections with one of the sides of the mesh, said side having N×M nodes, each of the I/O connections being tied to a unique one of the nodes in said side; and tying I/O cards to the I/O connections.

According to another embodiment, a computer program product includes one or more computer readable storage media, and program instructions collectively stored on the one or more computer readable storage media, the program instructions including instructions configured to cause one or more processors to perform a method including arranging, by the one or more processors, a collection of computing nodes in a mesh of N×M×Z topology, the nodes including computational hardware, wherein Z<N and Z<M, and wherein N and M are at least equal to 4; interfacing, by the one or more processors, a collection of I/O connections with one of the sides of the mesh, said side having N×M nodes, each of the I/O connections being tied to a unique one of the nodes in said side; and tying, by the one or more processors, I/O cards to the I/O connections.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 9 illustrates a method for reconfiguring a computational device having a collection of computing nodes arranged in a mesh of N×M×Z topology, in accordance with one embodiment of the present invention.

DETAILED DESCRIPTION

Figure 1:
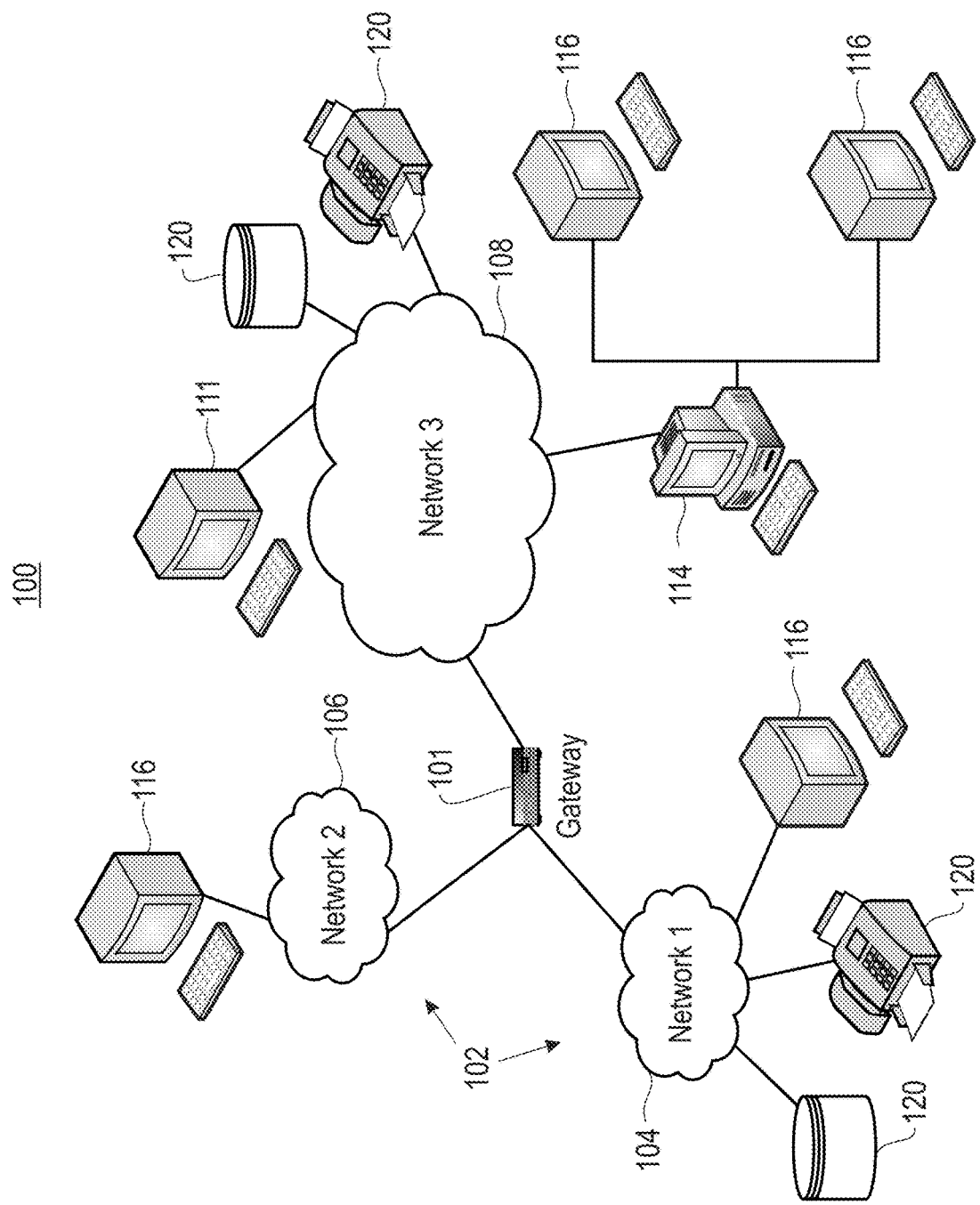
FIG. 1 illustrates a network architecture, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for configuring computing nodes in a three-dimensional (3D) mesh topology.

In one general embodiment, a computer-implemented method includes identifying predetermined operations to be performed by a processing device that initially has a plurality of computing nodes arranged in a three-dimensional (3D) mesh of N×M×Z topology, wherein Z<N and Z<M, and wherein N and M are at least equal to 4; determining an optimal input/output (I/O) bandwidth and/or an optimal node-to-node latency for the plurality of computing nodes to be used during the performance of the predetermined operations; adjusting the dimensions of the 3D mesh topology to obtain an adjusted 3D mesh topology that enables the optimal I/O bandwidth and optimal node-to-node latency for the plurality of computing nodes, wherein said adjusting includes reconfiguring the plurality of computing nodes into a 3D mesh of N'×M'×Z' topology, wherein at least two of the N, M, and Z values are different from their corresponding N', M', and Z' values, and wherein N×M×Z is equal to N'×M'×Z'; and executing the predetermined operations, with the plurality of computing nodes being arranged in the adjusted 3D mesh of N'×M'×Z' topology.

In another general embodiment, a computer program product for configuring computing nodes in a three-dimensional (3D) mesh topology includes a computer readable storage medium having program instructions embodied therewith, where the computer readable storage medium is not a transitory signal per se, and where the program instructions are executable by a processor to cause the processor to perform a method including identifying, by the processing device, predetermined operations to be performed by the processing device that initially has a plurality of computing nodes arranged in the three-dimensional (3D) mesh of N×M×Z topology, wherein Z<N and Z<M, and wherein N and M are at least equal to 4; determining, by the processing device, an optimal input/output (I/O) bandwidth and/or an optimal node-to-node latency for the plurality of computing nodes to be used during the performance of the predetermined operations; adjusting, by the processing device, the dimensions of the 3D mesh topology to obtain an adjusted 3D mesh topology that enables the optimal I/O bandwidth and optimal node-to-node latency for the plurality of computing nodes, wherein said adjusting includes reconfiguring, by the processing device, the plurality of computing nodes into a mesh of N'×M'×Z' topology, wherein at least two of N, M, and Z values are different from their corresponding N', M', and Z' values, and wherein N×M×Z is equal to N'×M'×Z'; and executing, by the processing device with the plurality of computing nodes being arranged in the adjusted 3D mesh of N'×M'×Z' topology, the predetermined operations.

In another general embodiment, a system includes a collection of computing nodes arranged in a mesh of N×M×Z topology, the nodes including computational hardware, wherein Z<N and Z<M, and wherein N and M are at least equal to 4; a collection of I/O connections interfaced with one of the sides of the mesh, said side having N×M nodes, each of the I/O connections being tied to a unique one of the nodes in said side; and I/O cards that are tied to the I/O connections.

In another general embodiment, a computer-implemented method is provided for use with a reconfigurable computational device having a collection of computing nodes arranged in a mesh of N×M×Z topology, the computing nodes including computational hardware, wherein Z<N and Z<M, and wherein N and M are at least equal to 4. The method includes using the computational device to perform computations characterized by (i) an initial system I/O bandwidth and (ii) an initial system node-to-node latency; reconfiguring the device into a mesh of N'×M'×Z' topology, wherein at least two of N, M, and Z values are different from their corresponding N', M', and Z' values, and wherein N×M×Z is equal to N'×M'×Z'; and using the device to perform computations characterized by (i) a modified system I/O bandwidth and (ii) a modified system node-to-node latency.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
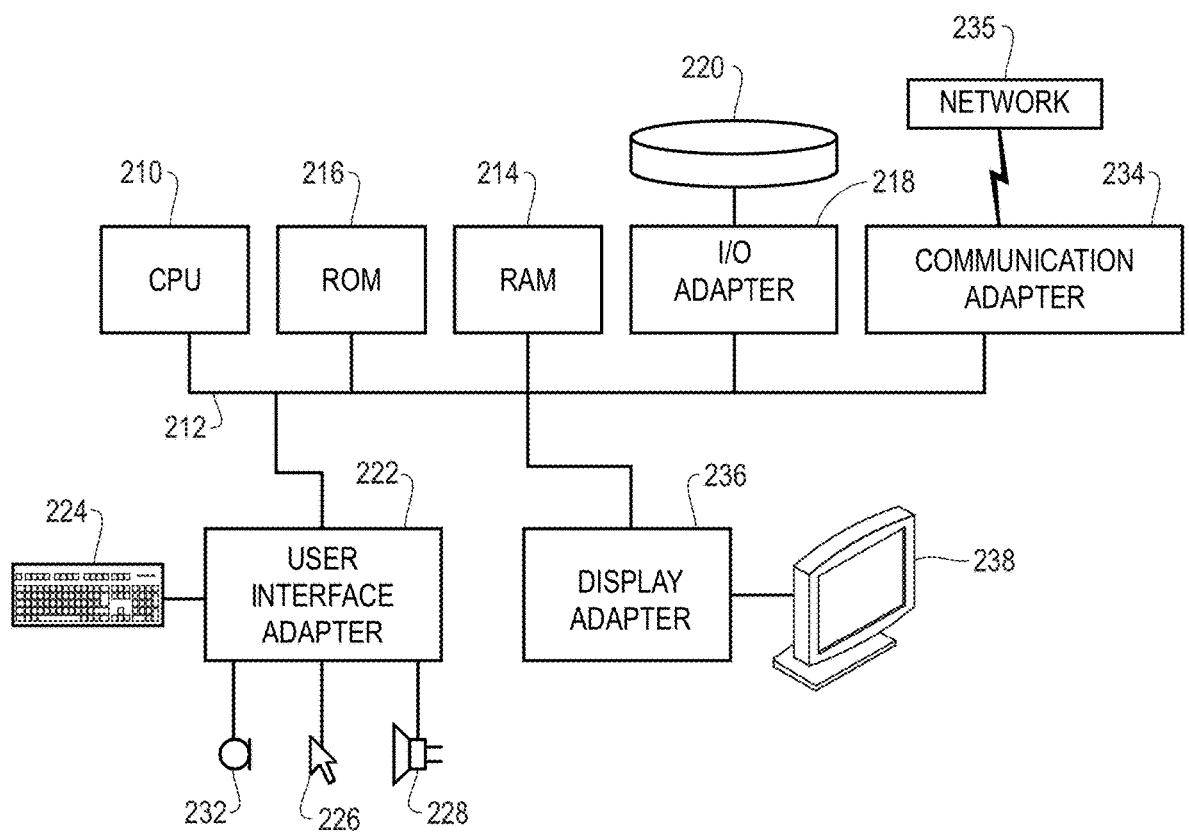
FIG. 2 shows a representative hardware environment that may be associated with the servers and/or clients of FIG. 1, in accordance with one embodiment of the present invention.

FIG. 2 shows a representative hardware environment associated with a user device 116 and/or server 114 of FIG. 1, in accordance with one embodiment. This figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
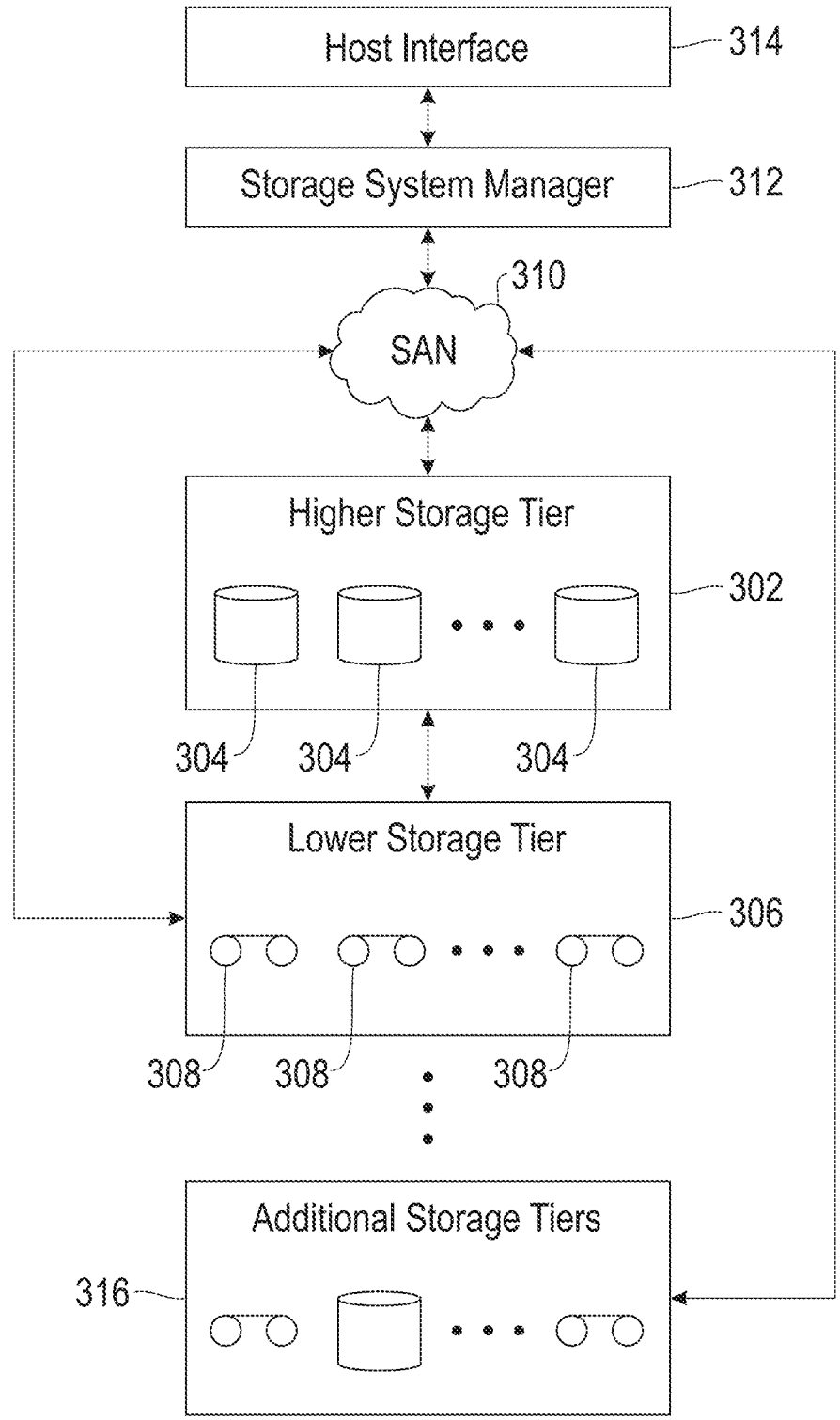
FIG. 3 illustrates a tiered data storage system in accordance with one embodiment of the present invention.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Exemplary Multi-Node System

One exemplary hardware multi-node system includes a large, highly scalable parallel processing system with compute nodes interconnected in a 3D mesh network topology. Each compute node may contain an ARM A9 CPU and a FPGA logic on the same die (System-on-Chip), along with 1 GB of dedicated memory. The availability of FPGA resources on every node allows application-specific processor offload.

The communication network that realizes the 3D mesh topology is implemented using single-span and multi-span SERDES (Serializer-Deserializer) links connected to the FPGA hardware. As the FPGA logic has access to these physical links, it is possible to build tailored network controllers based on the communication mode(s) most suited to the application. The ability to optimize the system performance across application code, middle-ware, system software, and hardware is one exemplary feature of the system.

In one embodiment, this 3D topology of distributed memory and computing resources, with the ability to have nodes exchange signals/messages with one another, may enable a hardware platform that can be used in myriad ways to progress fields of computing such as machine intelligence.

One exemplary system may include a development platform for emerging machine intelligence algorithms. It may include a parallel processing system with a large number of compute nodes organized in a high bandwidth 3D mesh network. This exemplary platform is designed to be highly flexible. Within each node is a dual-core Cortex A9 ARM processor and an FPGA on the same die, allowing the system to be reconfigured on a per node basis. Each node also includes 1 GB of dedicated DRAM that can be used as program and data space, and is accessible both from the processor and the FPGA. In response to receiving a high-performance learning task, many of the performance critical steps may be offloaded and optimized on the FPGA, with the ARM only providing auxiliary support (e.g., initialization, diagnostics, output transfer etc.).

In one embodiment, access to the physical communication links of the system may be through one or more FPGAs. Additionally, multiple distinct 'logical' channels of communication can be established, all utilizing the same underlying SERDES links. In this way, the network interfaces can be designed (and even progressively optimized) to best suit the applications executing on INC.

Hardware Card

One exemplary building block of the system is a hardware card. In one embodiment, each card contains twenty-seven nodes arranged in a 3×3×3 cube. In another embodiment, a system may be built with one to N cards (e.g., 512 cards would include 13,824 nodes).

Figure 4:
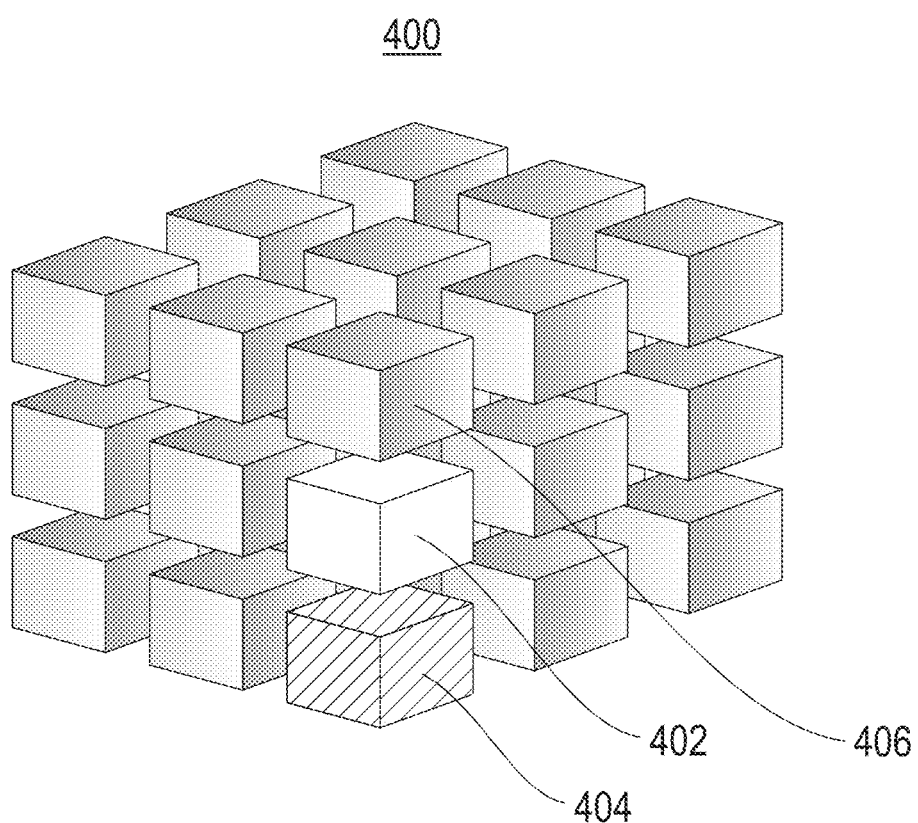
FIG. 4 illustrates an exemplary 3×3×3 mesh topology of an individual hardware card, in accordance with one embodiment of the present invention.

FIG. 4 illustrates an exemplary 3×3×3 mesh topology 400 of an individual hardware card, according to one exemplary embodiment. The nodes within the mesh topology 400 are placed on the card in a way to minimize the connection lengths between logically adjacent nodes. All nodes on a single card may be identical except for three exceptions. A first node 402 includes an Ethernet port, and acts as a gateway connecting an internal Ethernet network implemented on the FPGAs to a conventional external network. A second node 404 is a controller node that includes a 4 lane PCIe 2.0 connection that can be connected to a host PC. The second node 404 also has a serial connection that can serve as a console during boot time or that can be forwarded to the other nodes on the card. A third node 406 is capable of supporting a PCIe interface.

Figure 5:
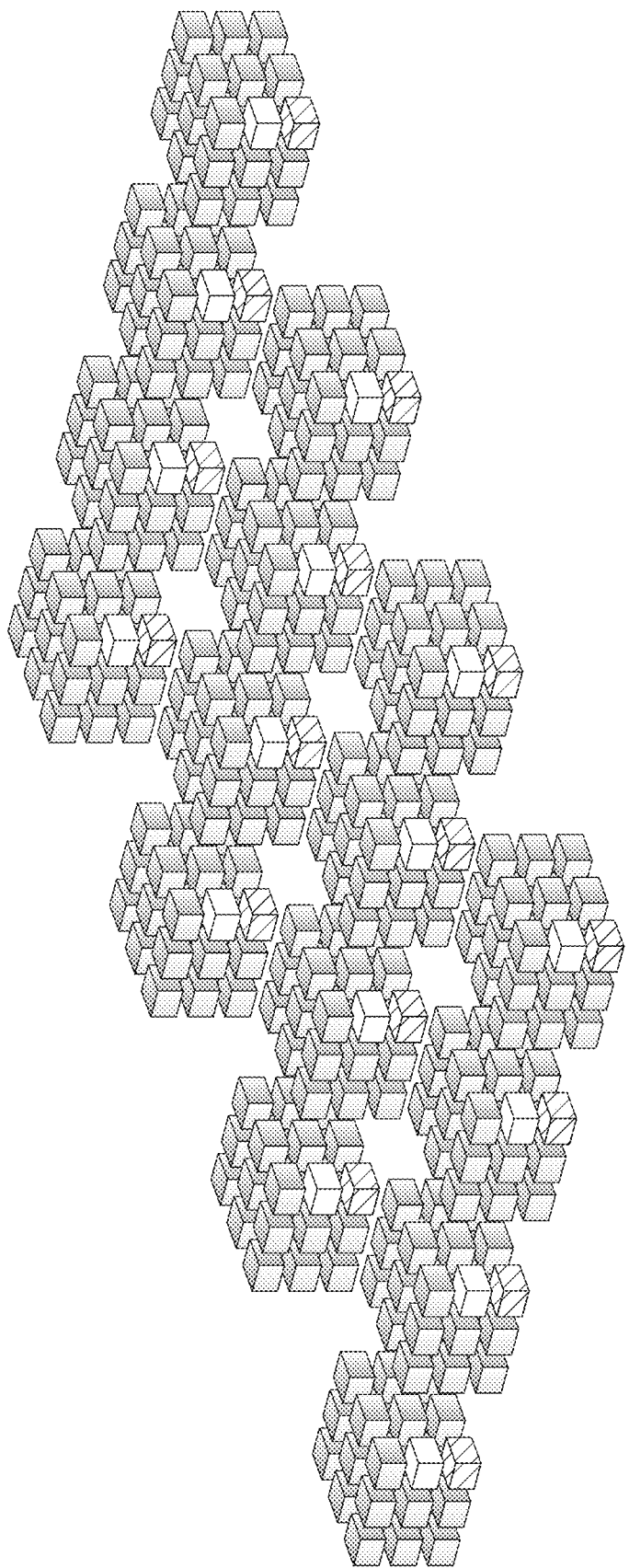
FIG. 5 illustrates an exemplary 12×12×3 mesh topology, in accordance with one embodiment of the present invention.

FIG. 5 illustrates an exemplary 12×12×3 mesh topology 500, according to one exemplary embodiment. As shown, sixteen hardware cards, each implementing a 3×3×3 cubic mesh (see, for example, FIG. 4) are connected through a backplane to form the 12×12×3 mesh topology 500.

Backplane, Cages and Racks

In one exemplary system, individual cards plug into a backplane. Each backplane can support a predetermined number of cards (e.g., sixteen), and the backplane wiring arranges the nodes of the cards into a predetermined mesh (e.g., sixteen cards yield a 12×12×3 mesh). The backplane and cards may be enclosed in a card cage. Connectors on the back side of the backplane allow cages to be connected vertically.

Figure 6:
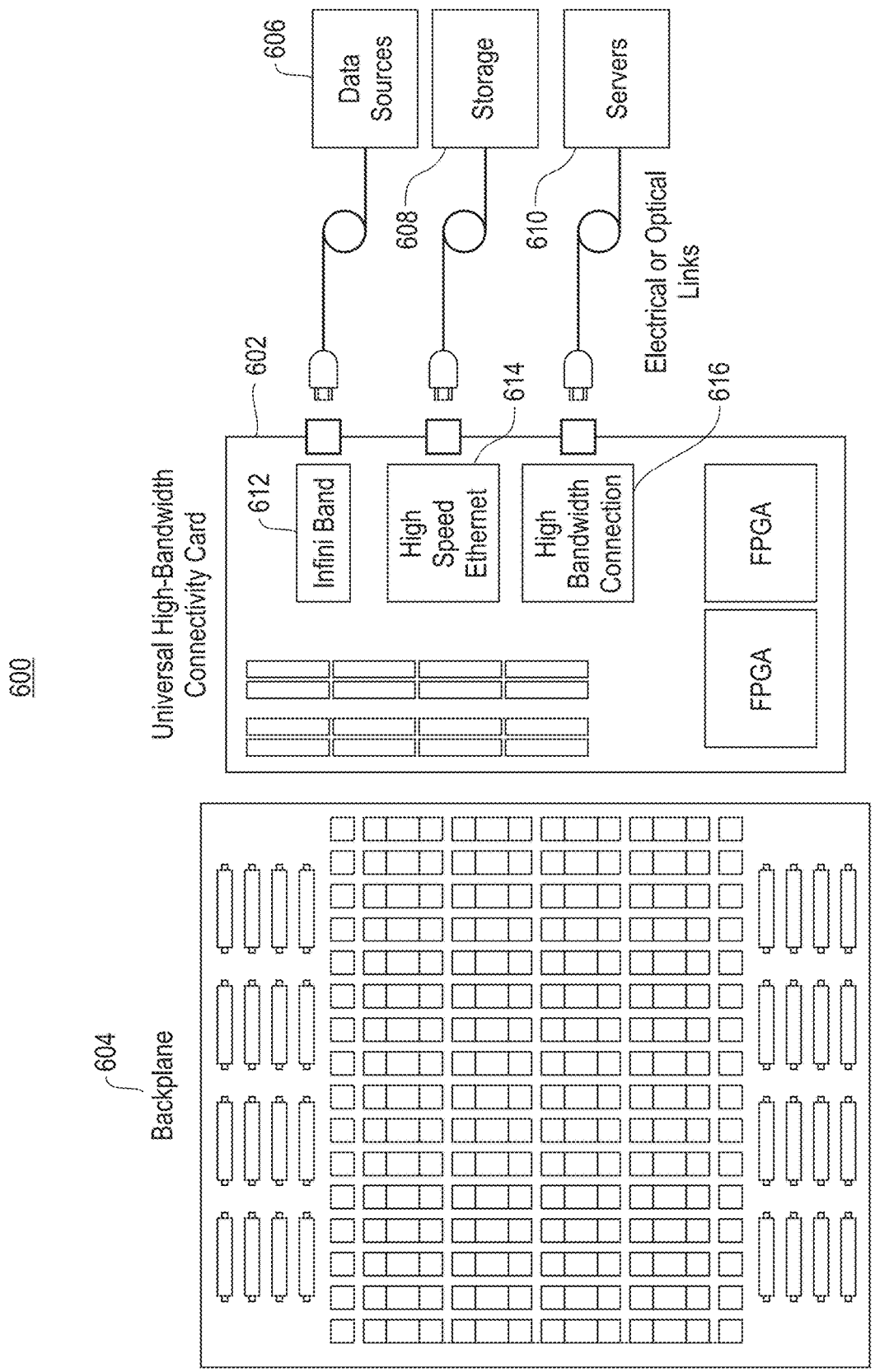
FIG. 6 illustrates an exemplary implementation of a universal high-bandwidth connectivity card, in accordance with one embodiment of the present invention.

FIG. 6 illustrates an exemplary implementation 600 of a universal high-bandwidth connectivity card 602, according to one embodiment. As shown, the universal high-bandwidth connectivity card 602 connects directly to a backplane 604 supporting a plurality of computing nodes arranged in a three-dimensional (3D) mesh topology. The universal high-bandwidth connectivity card 602 is also connected to external data sources 606, external storage 608, and external servers 610 via connections such as Infiniband 612, high speed Ethernet 614, and a high bandwidth connection 616. In this way, the universal high-bandwidth connectivity card 602 may facilitate communications between the plurality of computing nodes arranged in a three-dimensional (3D) mesh topology and the external data sources 606, external storage 608, and external servers 610.

Figure 7:
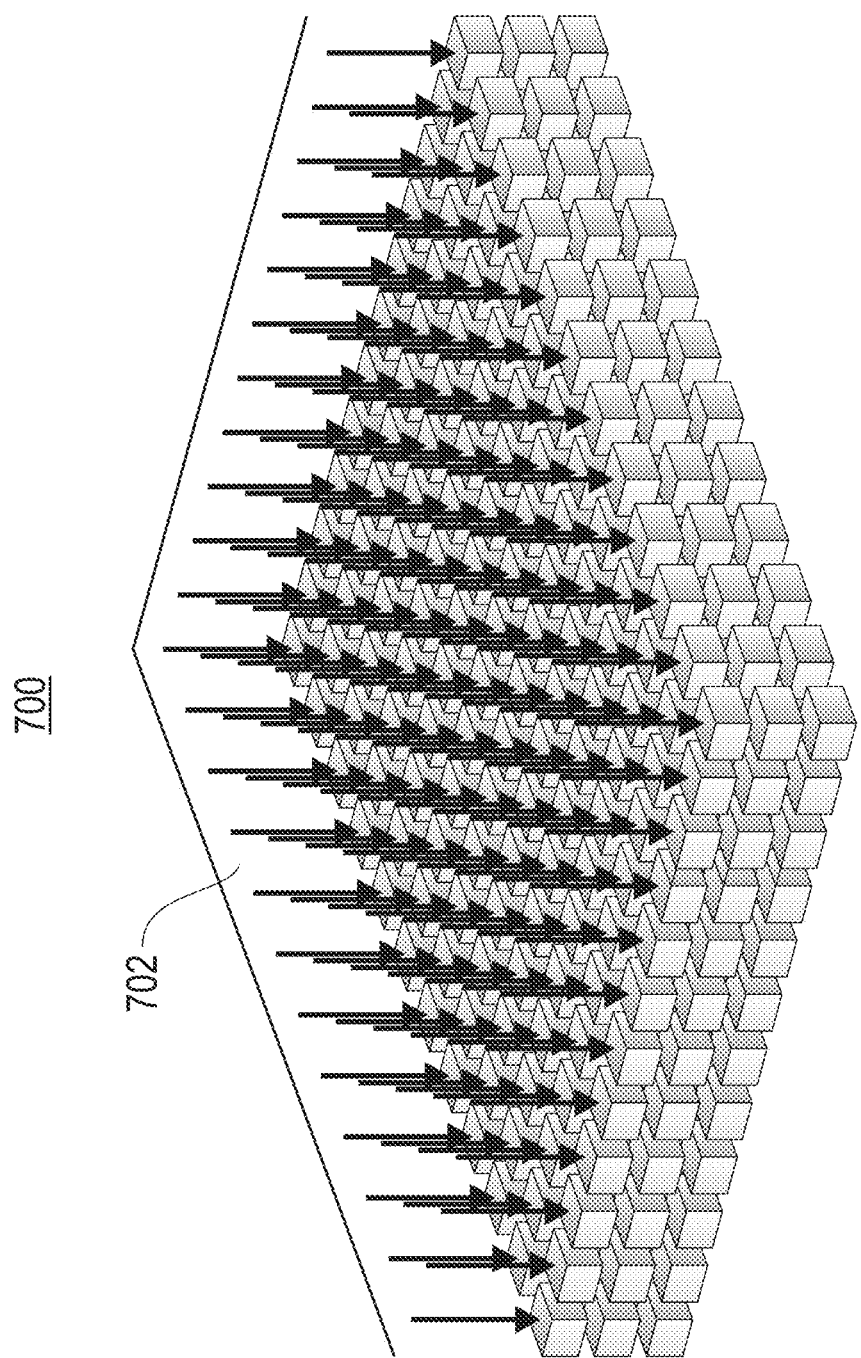
FIG. 7 illustrates an exemplary 3D mesh topology receiving input via one of its faces, in accordance with one embodiment of the present invention.

FIG. 7 illustrates an exemplary 3D mesh topology 700 receiving input via one of its faces 702, according to one exemplary embodiment. As shown, a top face 702 of the 3D mesh topology 700 performs I/O operations for the plurality of computing nodes within the 3D mesh topology 700, thereby illustrating a constraint of the 3D mesh topology 700.

Physical Links

Each node on a card may be connected to its nearest orthogonal neighbors by a single span link, with a predetermined number (e.g., six) bi-directional single span links per node. The nodes on the faces of the cube (i.e. all nodes other than the central node, etc.) have single span links that leave the card, and such nodes may have nearest neighbors on other cards in the system. In addition to single span links, six bi-directional multi-span links allow for more efficient communication in a larger system. Multi-span links connect nodes that are three apart in any one orthogonal direction and may begin and terminate on different cards. In one embodiment, with a total of 432 links leaving or entering the card, and 1 gigabyte (GB) per second per link, a potential maximum bandwidth of 432 GB per second may be obtained per card.

The communications links may include high speed, serial, unidirectional SERDES links. The link may have two wires (e.g., the differential data lines). The links may be controlled by a credit scheme to ensure that overrun errors do not occur and no data are lost. A receiving link sends (via its paired transmit link) a count of how many bytes of data it is willing to receive. A transmitting link will decrement its count as it sends data and may never send more data than it holds credits from the receiver. The receiving side will add to the credit balance as it frees up buffer space. This credit system is implemented entirely in the hardware fabric and may not involve the ARM processor or software.

Packet Routing

In one embodiment, the communication network may support directed and broadcast packet routing schemes, as well as multicast or network defect avoidance schemes.

In a directed routing mode, a packet originating from the processor complex or the FPGA portion of a compute node may be routed to a single destination. Both single-span and multi-span links may be used for the routing, and the packet will be delivered with a minimum number of hops. The packet routing mechanism may be implemented entirely on the FPGA fabric, and the ARM processors may only be involved at the source and destination nodes.

In one embodiment, a broadcast packet may radiate out from the source node in all directions and may be delivered to every node in the system. Broadcast packets only use the single-span links in the system for simplicity of routing. Depending on which link received a broadcast packet, the receiving node may choose to a) forward to all other links, b) forward to a subset of links, or c) stop forwarding. By choosing the rules for these three scenarios carefully, it is possible to ensure that all nodes in the system receive exactly one copy of the broadcast packet.

Connectivity and Communication

Multiple virtual channels can be designed to sit atop the underlying router logic described above to give the processor and FPGA logic different virtual or logical interfaces to the communication network.

Exemplary Configuration

Figure 8:
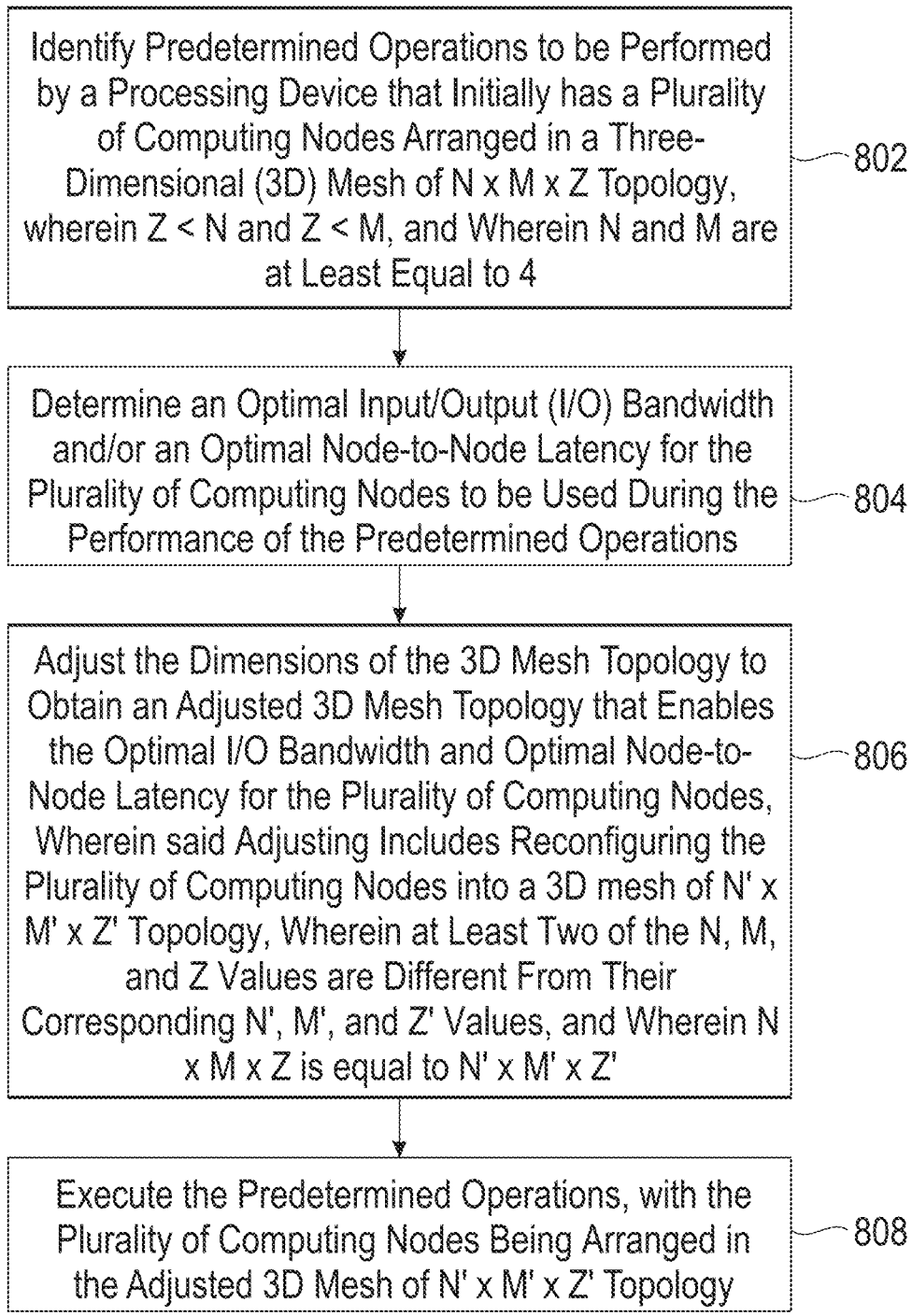
FIG. 8 illustrates a method for configuring computing nodes in a three-dimensional (3D) mesh topology, in accordance with one embodiment of the present invention.

Now referring to FIG. 8, a flowchart of a method 800 for configuring computing nodes in a three-dimensional (3D) mesh topology is shown according to one embodiment. The method 800 may be performed in accordance with the present invention in any of the environments depicted in FIGS. 1-7, among others. Of course, greater or fewer operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where predetermined operations to be performed by a processing device that initially has a plurality of computing nodes arranged in a three-dimensional (3D) N×M×Z mesh topology are identified, wherein Z<N and Z<M, and wherein N and M are at least equal to 4. In one embodiment, each of the plurality of computing nodes may include a programmable integrated circuit (e.g., a field-programmable gate array (FPGA), a central processing unit (CPU), a graphics processing unit (GPU), etc.). In another embodiment, the computing nodes may be physically arranged on one or more hardware cards using printed circuit board (PCB) wiring.

Additionally, in one embodiment, a plurality of hardware cards containing the computing nodes may be interconnected using one or more backplanes. For example, each backplane may enable communications between separate groups of hardware cards. In another embodiment, the computing nodes may communicate with external data sources via a backplane and a connectivity card. For example, a universal high-bandwidth connectivity card may enable communications between the plurality of computing nodes (via a backplane) and external data sources such as external storage, servers, etc. (via one or more connections such as Infiniband, high speed Ethernet, etc.).

Further, in one embodiment, the 3D mesh topology may include a three-dimensional grouping of the plurality of computing nodes. For example, the 3D mesh topology may have a height dimension (N), a width dimension (M), and a depth dimension (Z). In another embodiment, the predetermined operations may include any processing operations able to be performed by the plurality of computing nodes.

For example, the predetermined operations may include one or more of data creation, data modification, data deletion, data transfer, data copying, etc. In another example, the predetermined operations may be sent to the plurality of computing nodes by one or more predetermined applications. In yet another example, the predetermined operations may be included within a neural network implementation.

Further still, in one embodiment, the predetermined operations may be sent from one or more external data sources (e.g., one or more external servers, etc.).

Also, method 800 may proceed with operation 804, where an optimal input/output (I/O) bandwidth and/or an optimal node-to-node latency are determined for the plurality of computing nodes to be used during the performance of the predetermined operations. In one embodiment, the 3D mesh topology may have six faces (e.g., each of the six faces may be a side of the 3D mesh topology). In another embodiment, the 3D mesh topology may have predetermined constraints, based on a physical construction of the 3D mesh topology.

For example, a backplane communicating with the plurality of computing nodes may only communicate (e.g., perform I/O operations) with a single face of the 3D mesh. In another example, the backplane may enable communication with external data sources. For instance, the communication may include the receipt of predetermined operations from the external data sources, the output of data resulting from those predetermined operations to the external data sources, etc. In another example, each of the plurality of computing nodes may only talk with direct neighbors of the node within the 3D mesh topology.

In addition, in one embodiment, the I/O bandwidth may indicate a maximum bandwidth to and from the plurality of computing nodes via an available backplane. In another embodiment, the node-to-node latency may indicate a worst-case latency between computing nodes having a furthest distance apart within the 3D mesh topology. In yet another embodiment, the optimal input/output (I/O) bandwidth and optimal node-to-node latency may include predetermined bandwidth and latency numbers determined for the predetermined operations that optimize a performance of an execution of the predetermined operations by the plurality of computing nodes.

Furthermore, method 800 may proceed with operation 806, where the dimensions of the 3D mesh topology are adjusted to obtain an adjusted 3D mesh topology that enables the optimal I/O bandwidth and optimal node-to-node latency for the plurality of computing nodes, where said adjusting includes reconfiguring the plurality of computing nodes into a mesh of N'×M'×Z' topology, wherein at least two of N, M, and Z values are different from their corresponding N', M', and Z' values, and wherein N×M×Z is equal to N'×M'×Z'. In one embodiment, in view of the predetermined constraints of the 3D mesh topology, adjustments may be made to the dimensions of the 3D mesh topology that change an I/O bandwidth and a node-to-node latency for the plurality of computing nodes.

Further still, in one embodiment, a current I/O bandwidth of the plurality of the computing nodes in an original 3D mesh topology may be compared to the optimal I/O bandwidth. In another embodiment, in response to determining that the optimal I/O bandwidth is greater than the current I/O bandwidth, a face of the 3D mesh topology performing I/O may be increased in size in order to increase an I/O bandwidth of the plurality of computing nodes.

For example, the size of the face of the 3D mesh topology may be enlarged by directing the predetermined operations from an external data source to an increased number of computing nodes within the 3D mesh topology via a backplane. In another example, each computing node within the 3D mesh topology may have one or more I/O connections. In yet another example, by sending the predetermined operations from the external data source to an increased number of computing nodes via the backplane, the number of nodes participating in I/O with the external data source may increase, which may increase a size of the single face of the 3D mesh communicating via the backplane. In still another example, increasing the size of the face of the 3D mesh topology performing I/O may also increase the distance between furthest computing nodes within the 3D mesh topology, which may increase node-to-node latency.

Also, in one embodiment, in response to determining that the optimal I/O bandwidth is less than the current I/O bandwidth, the current 3D mesh topology may be unchanged.

Additionally, in one embodiment, a current node-to-node latency of the plurality of the computing nodes in the original 3D mesh topology may be compared to the optimal node-to-node latency. In another embodiment, in response to determining that the optimal node-to-node latency is less than the current node-to-node latency, the distance between furthest computing nodes within the 3D mesh topology may be decreased in order to decrease node-to-node latency within the plurality of computing nodes.

For example, the distance between furthest computing nodes within the 3D mesh topology may be adjusted by adjusting a size of each face within the 3D mesh topology. In another example, the distance between furthest computing nodes within the 3D mesh topology is minimized when each face of the 3D mesh topology is equal in size. In yet another example, the size of the face of the 3D mesh topology performing I/O may be increased or decreased in size (e.g., using the above techniques) to bring a size of the face closer to sizes of the other faces of the 3D mesh topology, thereby minimizing the distance between furthest computing nodes within the 3D mesh topology. In still another example, decreasing the size of the face of the 3D mesh topology performing I/O may reduce the I/O bandwidth of the plurality of computing nodes.

Further, in one embodiment, in response to determining that the optimal node-to-node latency is greater than the current node-to-node latency, the current 3D mesh topology may be unchanged.

Further still, method 800 may proceed with operation 808, where the predetermined operations are executed with the plurality of computing nodes being arranged in the adjusted 3D mesh of N'×M'×Z' topology. In one embodiment, the predetermined operations may be sent as input to the plurality of computing nodes arranged in the adjusted 3D mesh topology. In another embodiment, the predetermined operations may be sent to the computing nodes utilizing a connectivity card, one or more backplanes, etc.

For example, the predetermined operations may be sent from an external data source to a connectivity card, which in turn sends the operations to the computing nodes via a backplane. In another example, any output produced by the plurality of computing nodes may be sent back to the external data source (or another external data source) via the backplane and connectivity card.

In this way, the plurality of computing nodes may be dynamically arranged in an optimized fashion when performing the predetermined operations. This optimized arrangement may improve an implementation of the predetermined operations by the plurality of computing nodes, which may in turn reduce an amount of processing and/or power required by the plurality of computing nodes. As a result, a performance of the plurality of computing nodes may be improved.

Now referring to FIG. 9, a flowchart of a method 900 for reconfiguring a computational device having a collection of computing nodes arranged in a mesh of N×M×Z topology is shown according to one embodiment. In one embodiment, the nodes include computational hardware, Z<N and Z<M, and N and M are at least equal to 4. The method 900 may be performed in accordance with the present invention in any of the environments depicted in FIGS. 1-7, among others. Of course, greater or fewer operations than those specifically described in FIG. 9 may be included in method 900, as would be understood by one of skill in the art upon reading the present descriptions.

Each of the steps of the method 900 may be performed by any suitable component of the operating environment. For example, in various embodiments, the method 900 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 900. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 9, method 900 may initiate with operation 902, where the device is used to perform computations characterized by (i) an initial system I/O bandwidth and (ii) an initial system node-to-node latency. Additionally, method 900 may proceed with operation 904, where the device is reconfigured into a mesh of N'×M'×Z' topology, wherein at least two of N, M, and Z values are different from their corresponding N', M', and Z' values, and wherein N×M×Z is equal to N'×M'×Z'.

Further, method 900 may proceed with operation 906, where the device is used to perform computations characterized by (i) a modified system I/O bandwidth and (ii) a modified system node-to-node latency. In one embodiment, the modified I/O bandwidth is greater than the initial I/O bandwidth. In another embodiment, the modified system node-to-node latency is less than the initial system node-to-node latency.

In one embodiment, a system includes a collection of computing nodes arranged in a mesh of N×M×Z topology, the nodes including computational hardware, wherein Z<N and Z<M, and wherein N and M are at least equal to 4. The system also includes a collection of I/O connections interfaced with one of the sides of the mesh, said side having N×M nodes, each of the connections being tied to a unique one of the nodes in said side. Further, the system includes I/O cards that are tied to the I/O connections. In one embodiment, the computational hardware is selected from the group consisting of CPUs, GPUs, FPGAs, and memory elements.

Additionally, in one embodiment, a system includes a collection of computing nodes arranged in a mesh of N×M×Z topology, the nodes including computational hardware, where (i) Z≤N/2 and Z≤M/2; and (ii) N and M are at least equal to 4. Examples of this topology include a 12×12×6 mesh topology and a 16×16×3 mesh topology. This configuration may improve an I/O performance of the system by maximizing a face of the 3D mesh topology performing I/O.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a collection of computing nodes arranged in a mesh of N×M×Z topology, the nodes including computational hardware, wherein Z<N and Z<M, and wherein N and M are at least equal to 4;
    a collection of input/output (I/O) connections interfaced with one of the sides of the mesh, said side having N×M nodes, each of the I/O connections being tied to a unique one of the nodes in said side; and
    a backplane communicating with the collection of computing nodes through the one of the sides of the mesh, wherein the N×M×Z topology of the mesh is reconfigured by adjusting a number of nodes to which operations are sent by the backplane, wherein Z is greater than 1 after the reconfiguration.

2. The system of claim 1, wherein the computational hardware includes one or more central processing units (CPUs).

3. The system of claim 1, wherein the computational hardware includes one or more graphics processing units (GPUs).

4. The system of claim 1, wherein the computational hardware includes one or more field-programmable gate arrays (FPGAs).

5. The system of claim 1, wherein the computational hardware includes one or more memory elements.

6. The system of claim 1, wherein:
    the N×M×Z topology of the mesh is reconfigured into a 3D mesh of N'×M'×Z' topology, wherein at least two of the N, M, and Z values are different from their corresponding N', M', and Z' values, and wherein N×M×Z is equal to N'×M'×Z'.

7. The system of claim 1, wherein Z≤N/2 and Z≤M/2.

8. The system of claim 1, wherein the collection of computing nodes is physically arranged on a plurality of hardware cards using printed circuit board (PCB) wiring, and the plurality of hardware cards are interconnected using one or more backplanes.

9. A method, comprising:
    arranging a collection of computing nodes in a mesh of N×M×Z topology, the nodes including computational hardware, wherein Z<N and Z<M, and wherein N and M are at least equal to 4, and wherein Z is greater than 1;
    interfacing a collection of input/output (I/O) connections with one of the sides of the mesh, said side having N×M nodes, each of the I/O connections being tied to a unique one of the nodes in said side;
    communicating with the collection of computing nodes by a backplane through the one of the sides of the mesh, and
    reconfiguring the N×M×Z topology of the mesh by adjusting a number of nodes to which operations are sent by the backplane.

10. The method of claim 9, wherein the computational hardware includes one or more central processing units (CPUs).

11. The method of claim 9, wherein the computational hardware includes one or more graphics processing units (GPUs).

12. The method of claim 9, wherein the computational hardware includes one or more field-programmable gate arrays (FPGAs).

13. The method of claim 9, wherein the computational hardware includes one or more memory elements.

14. The method of claim 9, wherein the N×M×Z topology of the mesh is reconfigured into a 3D mesh of N'×M'×Z' topology, wherein at least two of the N, M, and Z values are different from their corresponding N', M', and Z' values, and wherein N×M×Z is equal to N'×M'×Z'.

15. The method of claim 9, wherein Z≤N/2 and Z≤M/2.

16. The method of claim 9, wherein the collection of computing nodes is physically arranged on a plurality of hardware cards using printed circuit board (PCB) wiring, and the plurality of hardware cards are interconnected using one or more backplanes.

17. A computer program product comprising one or more computer readable storage media, and program instructions collectively stored on the one or more computer readable storage media, the program instructions comprising instructions configured to cause one or more processors to perform a method comprising:
    arranging, by the one or more processors, a collection of computing nodes in a mesh of N×M×Z topology, the nodes including computational hardware, wherein Z<N and Z<M, and wherein N and M are at least equal to 4;
    interfacing, by the one or more processors, a collection of input/output (I/O) connections with one of the sides of the mesh, said side having N×M nodes, each of the I/O connections being tied to a unique one of the nodes in said side;
    communicating with the collection of computing nodes by the one or more processors using a backplane through the one of the sides of the mesh, and
    reconfiguring, by the one or more processors, the N×M×Z topology of the mesh by adjusting a number of nodes to which operations are sent by the backplane, wherein Z is greater than 1 after the reconfiguration.

18. The computer program product of claim 17, wherein the computational hardware includes one or more central processing units (CPUs).

19. The computer program product of claim 17, wherein the computational hardware includes one or more graphics processing units (GPUs).

20. The computer program product of claim 17, wherein the computational hardware includes one or more field-programmable gate arrays (FPGAs).

* * * * *